(12) United States Patent
Saunders

(10) Patent No.: US 7,701,955 B1
(45) Date of Patent: Apr. 20, 2010

(54) UNDERSEA CABLE SYSTEM AND CABLE LANDING STATION SHARED BY A PLURALITY OF CARRIERS

(75) Inventor: Brian Dean Saunders, Lawrence, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 903 days.

(21) Appl. No.: 11/345,576

(22) Filed: Feb. 1, 2006

(51) Int. Cl.
*H04L 12/56* (2006.01)

(52) U.S. Cl. ........................................ 370/401; 370/355

(58) Field of Classification Search .................. 370/203, 370/211, 351, 389, 400, 401, 352, 355; 398/43, 398/45, 48, 49, 140, 158, 165, 167.5
See application file for complete search history.

(56) References Cited

U.S. PATENT DOCUMENTS

| | | | |
|---|---|---|---|
| 5,550,816 A * | 8/1996 | Hardwick et al. ........... | 370/397 |
| 6,092,113 A * | 7/2000 | Maeshima et al. .......... | 709/230 |
| 6,618,355 B1 * | 9/2003 | Gulliford et al. ............ | 370/230 |
| 6,680,948 B1 * | 1/2004 | Majd et al. .................. | 370/401 |
| 2003/0067655 A1 * | 4/2003 | Pedersen et al. ............ | 359/152 |
| 2004/0258003 A1 * | 12/2004 | Kokot et al. ................ | 370/254 |
| 2005/0095006 A1 | 5/2005 | Evangelides, Jr. et al. | |

* cited by examiner

*Primary Examiner*—Chi H Pham
*Assistant Examiner*—Weibin Huang

(57) ABSTRACT

A cable landing station for an undersea cable shared by a plurality of carriers is provided according to some examples of the invention. The cable landing station includes a first interface adapted for coupling to a first undersea cable portion and at least a second interface adapted for coupling to at least a second undersea cable portion. The cable landing station further includes a router including a plurality of ports. Each carrier of the plurality of carriers is assigned at least one exclusive port of the plurality of ports. The router is coupled to the first interface and the at least second interface. The router is logically partitioned between the carriers of the plurality of carriers and is configured to route packets between the first interface, the second interface, and the plurality of ports according to the logical partitioning between the carriers.

24 Claims, 5 Drawing Sheets

UNDERSEA CABLE SYSTEM AND CABLE LANDING STATION SHARED BY A PLURALITY OF CARRIERS

BACKGROUND OF THE INVENTION

1. Field of the Invention

The invention is related to the field of undersea cable, and in particular, to an undersea cable system and a cable landing station shared by a plurality of carriers.

2. Statement of the Problem

Undersea cable networks are used to connect landmasses separated by seas or oceans. The landmasses can include islands, continents, etc. One or more undersea cables are used to link together multiple landmasses and exchange communications between the landmasses.

Optical cables are widely used for undersea cable systems due to their high bandwidth capacity. An optical cable typically comprises a bundle of multiple optical fibers. In addition, each fiber can carry multiple signals through use of some manner of compression, multiplexing, etc. One commonly used capacity expansion technique for optical fibers is a wavelength multiplexing technique. Separate wavelengths of light can be injected onto a fiber at one end and received and separately processed at the other end. Each wavelength can therefore convey an individual data stream.

In the prior art, each carrier installs, operates, and maintains their own router (and any other cable terminating equipment). Typically, due to their inherently high cost, multiple communication carriers share the expense of installing and operating such a cable system. As a result, communications of these multiple carriers must be exchanged while yet being kept segregated from the communications of other carriers. A prior art cable landing station therefore includes as many routers as there are carriers, leading to crowding in the installation, complexity, and excessive cost. In addition, controlling the resulting heating of multiple, essentially redundant pieces of equipment can be expensive and difficult.

SUMMARY OF THE SOLUTION

A cable landing station for an undersea cable shared by a plurality of carriers is provided according to some examples of the invention. The cable landing station comprises a first interface adapted for coupling to a first undersea cable portion and at least a second interface adapted for coupling to at least a second undersea cable portion. The cable landing station further comprises a router including a plurality of ports. Each carrier of the plurality of carriers is assigned at least one exclusive port of the plurality of ports. The router is coupled to the first interface and the at least second interface. The router is logically partitioned between the carriers of the plurality of carriers and is configured to route packets between the first interface, the second interface, and the plurality of ports according to the logical partitioning between the carriers.

An undersea cable system shared by a plurality of carriers is provided according to some examples of the invention. The undersea cable system comprises a plurality of undersea cable portions extending between a plurality of landmasses, one or more landlines extending onto each landmass of the plurality of landmasses, and a plurality of cable landing stations. A cable landing station of the plurality of cable landing stations is connected to the one or more landlines of the particular landmass and is further connected to a first undersea cable portion and at least a second undersea cable portion. The cable landing station comprises a first interface adapted for coupling to a first undersea cable portion, at least a second interface adapted for coupling to at least a second undersea cable portion, and a router including a plurality of ports. Each carrier of the plurality of carriers is assigned at least one exclusive port of the plurality of ports. The router is coupled to the first interface and the at least second interface. The router is logically partitioned between the carriers of the plurality of carriers and is configured to route packets between the first interface, the second interface, and the plurality of ports according to the logical partitioning between the carriers.

DESCRIPTION OF THE DRAWINGS

The same reference number represents the same element on all drawings.

DETAILED DESCRIPTION OF THE INVENTION

FIGS. 1-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
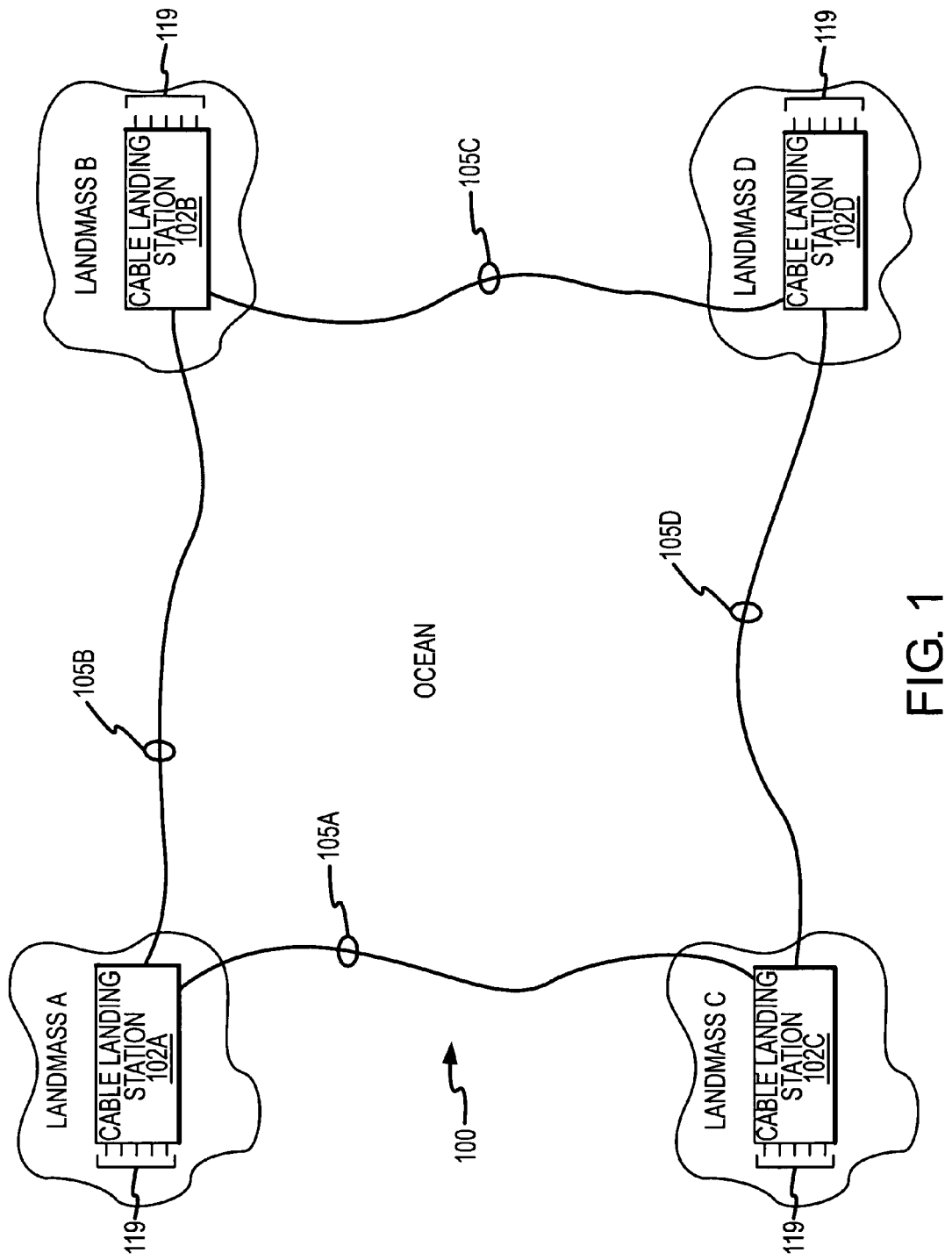
FIG. 1 shows an undersea cable system according to an embodiment of the invention.

FIG. 1 shows an undersea cable system 100 according to an embodiment of the invention. The undersea cable system 100 includes multiple cable landing stations 102 and connects multiple landmasses. Four landmasses A-D are shown, but it should be understood that varying numbers of landmasses can be connected according to the invention. Each landmass includes a cable landing station 102 (see FIG. 2 and the accompanying discussion).

Each cable landing station 102 is connected to a first undersea cable portion and at least a second undersea cable portion. As a result, each cable landing station 102 can send and receive communications to other cable landing stations 102 of the undersea cable system 100. However, it should be understood that a cable landing station 102 can be connected to more than two cable portions. In addition, each cable landing station 102 is connected to one or more landlines 119 that extend onto each landmass. In many cases, each carrier will provide one or more exclusive landlines 119. However, a carrier does not necessarily have landlines 119 extending onto every landmass.

The undersea cable 105 is shared among a plurality of communications carriers. Each carrier can own or lease a portion of the bandwidth available on the undersea cable 105. The communications traffic for each carrier can be placed onto and removed from the undersea cable 105, such as at each cable landing station 102A-102N.

The undersea cable 105 comprises one or more communications links. In one embodiment, the undersea cable 105 comprises an optical cable including one or more fibers. For example, in one embodiment, the undersea cable 105 can comprise at least one fiber pair comprising a transmit fiber and a receive fiber. Where an undersea cable 105 comprises a transmit/receive fiber pair, an interface 108 couples to both the transmit fiber and to the receive optical fiber. In one embodiment, the first and second interfaces 108A and 108B convert the optical communications to electrical communications and vice versa. Alternatively, the undersea cable 105 can comprise an electrical cable including one or more wires.

For purposes of security, communications traffic (i.e., packets) of one carrier is partitioned from the communications traffic of all other carriers. The communications traffic for each carrier can be partitioned by a router 114 of the cable landing station 102 (see FIG. 2 and the accompanying discussion below). In addition, the communications are partitioned by carrier in order to track and/or regulate usage (such as bandwidth usage) and to provide accounting and billing to each carrier for the communications capacity. In one embodiment, the communications traffic for each carrier is partitioned using tunneling, where packets are inserted to a "tunnel" that exists between two separate routers (see FIGS. 3-5 and the accompanying discussions). Each carrier can utilize an exclusive tunnel between landmasses.

Figure 2:
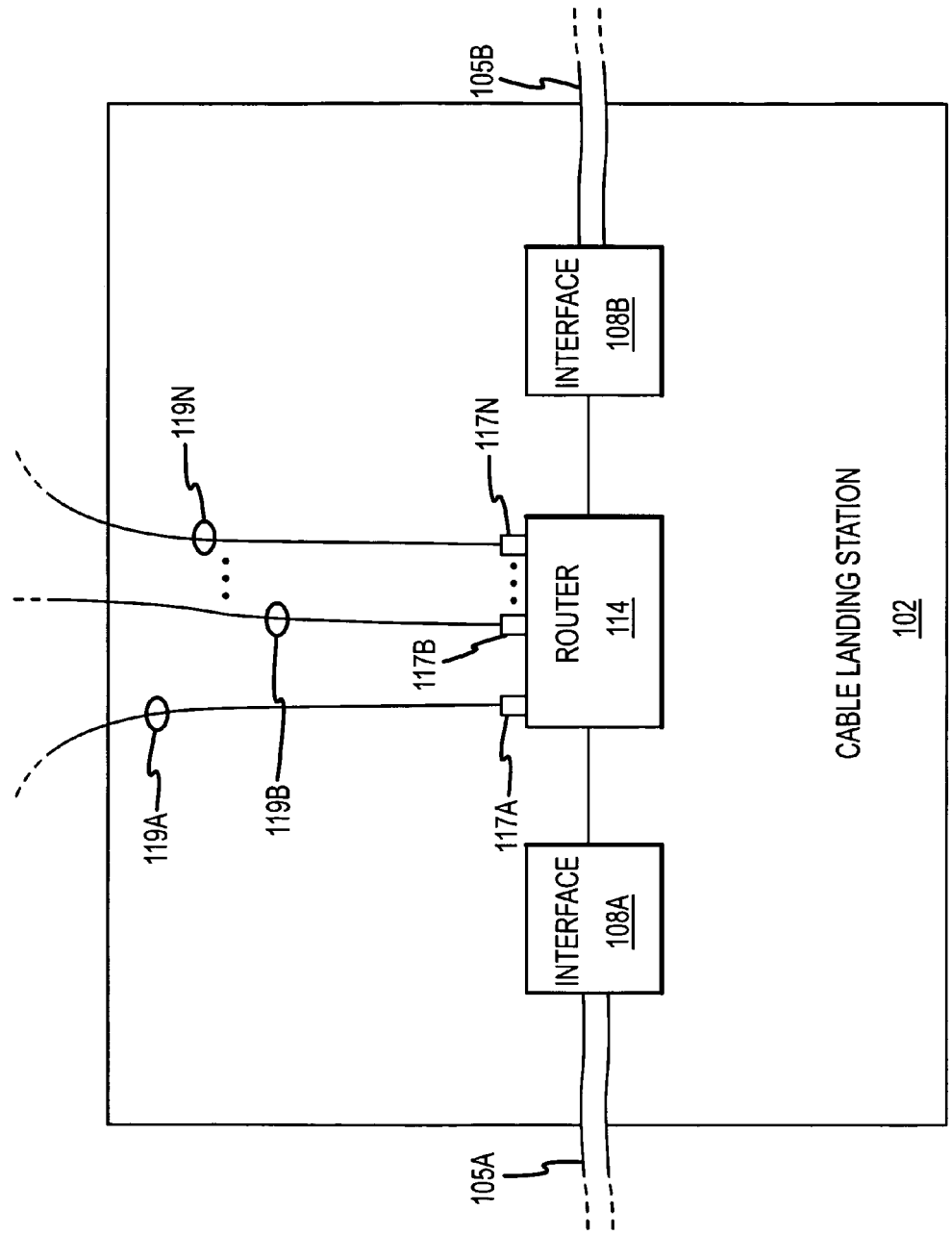
FIG. 2 shows a cable landing station for an undersea cable system according to an embodiment of the invention.

FIG. 2 shows a cable landing station 102 for an undersea cable system 100 according to an embodiment of the invention. The cable landing station 102 exchanges communications between portions of the undersea cable system 100 and further exchanges communications between the undersea cable system 100 and a landmass. The cable landing station 102 includes a first interface 108$a$ coupled to a first undersea cable portion 105$a$ and at least a second interface 108$b$ coupled to at least a second undersea cable portion 105$b$. The cable landing station 102 further includes a router 114 connected to the first interface 108$a$ and to the second interface 108$b$. The router 114 is partitioned according to carriers. The router 114 further includes a plurality of ports 117A-117N. Each carrier is assigned at least one exclusive port 117$x$ of the plurality of ports 117A-117N. A plurality of landlines 119A-119N are connected to the plurality of ports 117A-117N and can extend out over an associated landmass. Each carrier can therefore utilize one or more landlines of the plurality of landlines 119A-119N.

The cable landing station 102 receives communications from an associated landmass over the plurality of landlines 119A-119N and routes them onto the undersea cable system 100. In addition, the cable landing station 102 receives communications from the undersea cable system 100 and routes the communications onto appropriate landlines of the plurality of landlines 119A-119N.

Advantageously, only a single router 114 is needed in the cable landing station 102. Unlike the prior art, the cable landing station 102 does not add a separate router for each carrier. There is no need for redundant equipment. This reduces cost. This also reduces physical crowding in a cable landing facility, reduces power consumption, reduces heat generation, etc. As a result, the undersea cable system 100 can be shared among multiple carriers. A carrier consortium can construct the undersea cable system 100 at a lower cost and can spread the cost over multiple carriers. A consortium can design and construct the system to allow carriers to added or removed without need for installation/removal of any additional equipment. Therefore, the number of carriers sharing the undersea cable system 100 can be changed at any time.

The router 114 routes packets in the undersea cable system 100 based on addresses within the data packets (such as Internet Protocol (IP) addresses, for example). When the router 114 receives a packet, the router 114 makes a decision as to which communication link the packet is to be placed on. The router 114 can relay packets between the first undersea cable 105A and the second undersea cable 105B. In addition, the router 114 can route communications received from a landline 119$x$ onto an appropriate first or second undersea cable 105A or 105B. Further, the router 114 can receive incoming communications from first undersea cable 105A and/or the second undersea cable 105B and route the communications onto an appropriate landline 119$x$.

In one embodiment, the router 114 can partition the carriers by segregating packets by their destination addresses. Consequently, the router 114 can be programmed to recognize destination addresses of each carrier and can route packets by destination and therefore by carrier. In another embodiment, the router 114 can partition the carriers by tunneling (see FIGS. 3-5 and the accompanying discussion below).

Figure 3:
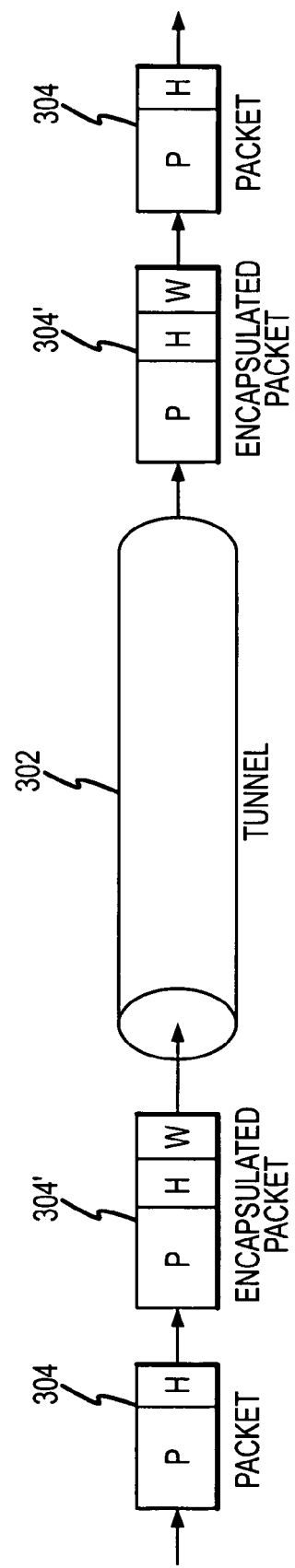
FIG. 3 shows a tunneling example according to the invention.

FIG. 3 shows a tunneling example according to the invention. At the left side of the figure, a packet is received by the router 114. The packet includes a header H and a payload P. The header comprises information that is used to transport the data, including a source address and a destination address. At the router 114, the packet is encapsulated as part of the tunneling process. The encapsulation adds a wrapper W (i.e., a new header) to the packet in order to form an encapsulated packet. All packets received at the router 114 are encapsulated in this manner.

The encapsulation allows packets destined for a destination IP address to be wrapped and re-directed to another IP address. In addition, the original header H and payload P can be encrypted and comprise the payload P' of the wrapper W. The encryption is made possible by the encapsulation. The encryption ensures that the true source and destination of the packet cannot be observed during transport through the tunnel. The encapsulation therefore creates a Virtual Private Network (VPN) between routers for a particular carrier.

The router 114 can receive packets from a first carrier and can perform a first encryption and a first encapsulation on the first carrier packets. Concurrently, the router 114 can receive packets from a second carrier and can perform a second encryption and a second encapsulation on the second carrier packets. As a result, the second carrier cannot overhear data, source, or destination information of the first carrier packets and vice versa.

Figure 4:
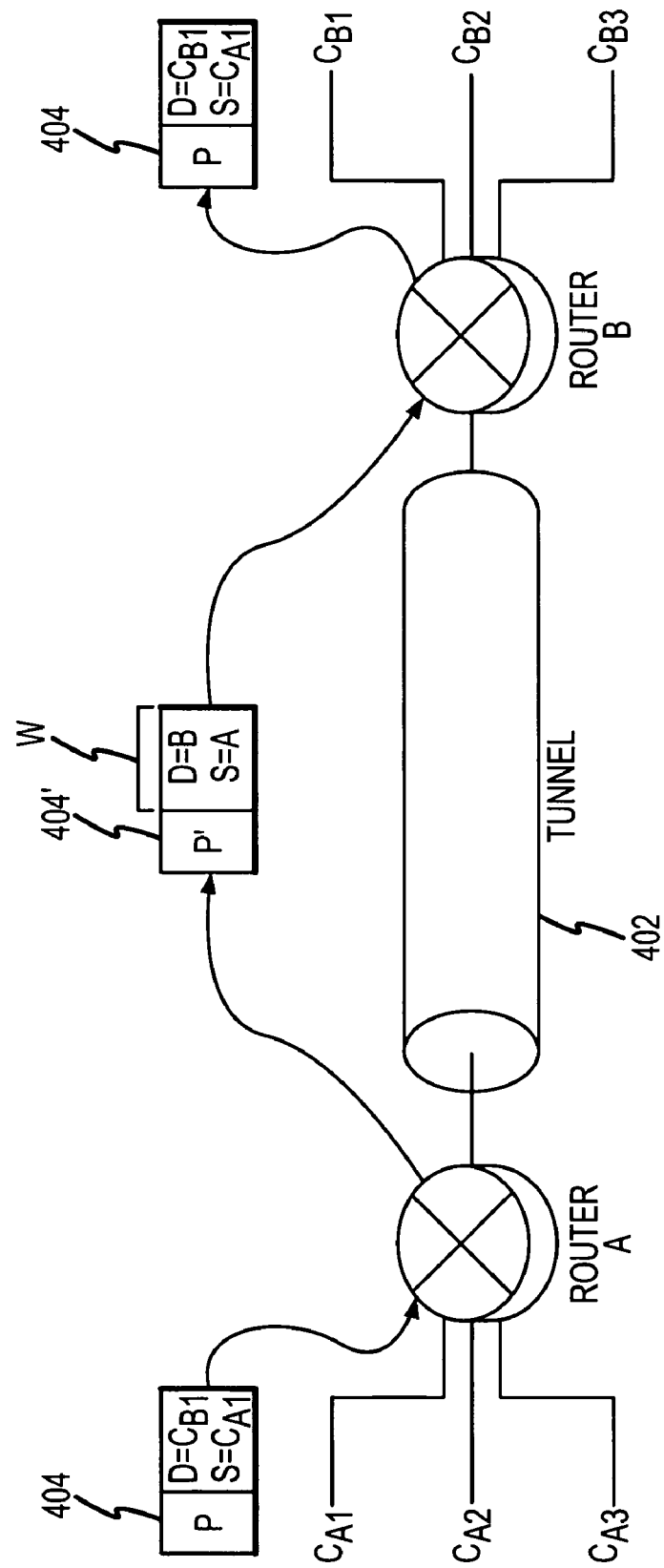
FIG. 4 shows a tunneling example according to an embodiment of the invention.

FIG. 4 shows a tunneling example according to an embodiment of the invention. In this embodiment, three carriers C1-C3 are shown and a tunnel 402 extends between router A and router B. In the example shown, a packet 404 is being sent from carrier line $C_{A1}$ of router A to carrier line $C_{B1}$ of router B over partitioned carrier 1. A packet 404 that is input to router A therefore includes a payload P, a destination address D=$C_{B1}$, and a source address S=$C_{A1}$.

When router A receives the packet 404, router A encapsulates the packet 404 in preparation for the tunneling. The original packet 404 now becomes an encapsulated packet 404', including a payload P'. The payload P' includes the original payload P and the original header H. The payload P' can be encrypted by the router A. The original destination address D=$C_{B1}$ and the original source address S=$C_{A1}$ are now not visible or observable during transport of the encapsulated packet.

The wrapper W can include a new destination address D, such as an address of the router B (i.e., D=B). Therefore, the destination address of the encapsulated packet 404' is D=B and the source address of the encapsulated packet 404' is S=A. If the encapsulated packet 404' is intercepted in the tunnel, the actual source and actual destination cannot be determined from the wrapper. In addition, because the payload P' of the encapsulated packet 404' can be encrypted, an interceptor cannot inspect the original payload P or the original header H.

Router A places the encapsulated packet 404' in the tunnel and the encapsulated packet 404' is subsequently received by router B. Router B strips off the wrapper W and decrypts the original header H and payload P. Router B inspects the original destination address of D=CB 1 and routes the packet 404 onto the carrier 1 landline $C_{B1}$ using the destination address. In this manner, the tunneling partitions the packets by carrier as they travel between routers and/or between landmasses.

Figure 5:
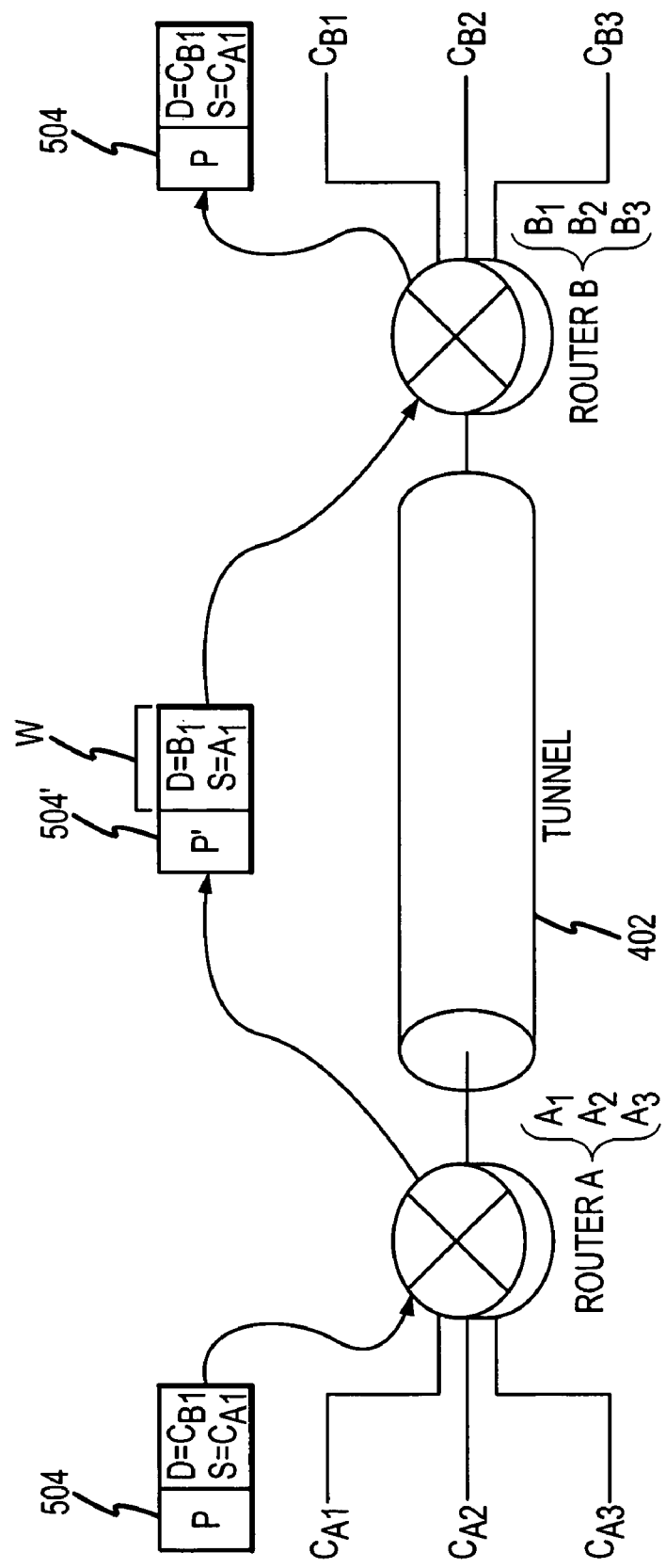
FIG. 5 shows a tunneling example according to an embodiment of the invention.

FIG. 5 shows a tunneling example according to an embodiment of the invention. In this embodiment, three carriers C1-C3, a tunnel 502, and routers A and B are shown. A packet 504 is being sent from carrier line $C_{A1}$ of router A to carrier line $C_{B1}$ of router B over partitioned carrier 1.

In this embodiment, each router has multiple IP addresses, one for each partitioned carrier. Router A therefore has been assigned an address A1 for carrier 1, address A2 for carrier 2, and address A3 for carrier 3. Likewise, router B has been assigned an address B 1 for carrier 1, address B2 for carrier 2, and address B3 for carrier 3. Therefore, when router A receives the original packet 504 over line $C_{A1}$ (such as onto a carrier 1 landline connected to router A, for example), router A encapsulates the packet with a destination address D=B1 (instead of the actual destination address D=$C_{B1}$). Alternatively, if router A were to receive a packet over line $C_{A2}$ (i.e., from a carrier 2 landline), router A would encapsulate the packet with a destination address D=B2. The router B receives the encapsulated packet 504' having destination address D=B1. The router B removes the wrapper W and decrypts the payload P', if needed. The recovered original packet 504 is subsequently transferred over line $C_{B1}$ (such as onto a carrier 1 landline connected to router B, for example).

Advantageously, the tunneling enables multiple carriers to share the undersea cable system. The tunneling enables multiple carriers to share the undersea cable system without mixing of traffic. The tunneling enables multiple carriers to share the undersea cable system while maintaining separate bandwidth allocations for the carriers. The tunneling enables bandwidth control so that one carrier cannot encroach in the bandwidth of another carrier. The partitioning enables each router to gather statistics by carrier and record packet through-put by carrier. This information can be used for accounting of carrier usage by monitoring traffic levels per tunnel.

An additional benefit of the tunneling is that the encapsulation can accept packets of various communications protocols and reduce them to a single protocol for transport through a tunnel. The encapsulation can therefore be used to deal with an unroutable protocol and can be used to eliminate multiple protocols.

The invention claimed is:

1. A cable landing station for an undersea cable shared by a plurality of carriers, the cable landing station comprising:
 a first interface adapted for coupling to a first undersea cable portion;
 at least a second interface adapted for coupling to at least a second undersea cable portion; and
 a router including a plurality of ports and having a plurality of packet addresses, with each carrier of the plurality of carriers being assigned at least one exclusive port of the plurality of ports, with the router being coupled to the first interface and the at least second interface and with the router being logically partitioned between the carriers by associating each carrier of the plurality of carriers with a separate packet address of the plurality of packet addresses, and with the router being configured to route packets between the first interface, the second interface, and the plurality of ports according to the logical partitioning between the carriers, with the router being configured to transfer the packets using tunneling by inserting the packets into a plurality of tunnels that exist between the router and another router at another cable landing station, wherein each tunnel of the plurality of tunnels is associated exclusively with a different one of the plurality of carriers.

2. The cable landing station of claim 1, wherein the router exchanges the packets via the tunnels with the other cable landing station.

3. The cable landing station of claim 1, wherein the router is assigned an IP address.

4. The cable landing station of claim 1, wherein the router is assigned at least one IP address per carrier.

5. The cable landing station of claim 1, wherein the router is assigned at least one IP address per port.

6. The cable landing station of claim 1, further comprising the router being configured to encrypt packets to be transferred.

7. The cable landing station of claim 1, with the router being further configured to regulate bandwidth by carrier.

8. The cable landing station of claim 1, with the router being further configured to record packet through-put by carrier.

9. The cable landing station of claim 1, further comprising the router granting excess bandwidth to a carrier when a corresponding carrier bandwidth exceeds a predetermined bandwidth threshold.

10. The cable landing station of claim 1, with the router being configured to determine when a Quality of Service (QoS) of a particular carrier is below a predetermined quality threshold and allocate and charge for a predetermined additional bandwidth if the QoS of the particular carrier drops below the predetermined quality threshold.

11. The cable landing station of claim 1, with the router being further configured to monitor a latency QoS characteristic.

12. The cable landing station of claim 1, with the router being further configured to monitor an average bandwidth QoS characteristic.

13. An undersea cable system shared by a plurality of carriers, the undersea cable system comprising:
 a plurality of undersea cable portions extending between a plurality of landmasses;
 one or more landlines extending onto each landmass of the plurality of landmasses;
 a plurality of cable landing stations, with a cable landing station of the plurality of cable landing stations being connected to the one or more landlines of the particular landmass and being connected to a first undersea cable portion and at least a second undersea cable portion, with the cable landing station comprising:
 a first interface adapted for coupling to a first undersea cable portion;
 at least a second interface adapted for coupling to at least a second undersea cable portion; and
 a router including a plurality of ports and having a plurality of packet addresses, with each carrier of the plurality of carriers being assigned at least one exclusive port of the plurality of ports, with the router being coupled to the first interface and the at least second interface and with the router being logically partitioned between the carriers by associating each carrier of the plurality of carriers with a separate packet address of the plurality of packet addresses, and with the router being configured to route packets between the first interface, the second interface, and the plurality of ports according to the logical partitioning between the carriers, with the router being configured to transfer the packets using tunneling by inserting the packets into a plurality of tunnels that exist between the router and another router at another cable landing station, wherein each tunnel of the plurality of tunnels is associated exclusively with a different one of the plurality of carriers.

14. The system of claim 13, wherein the router exchanges the packets via the tunnels with the other cable landing station.

15. The system of claim 13, wherein the router is assigned an IP address.

16. The system of claim 13, wherein the router is assigned at least one IP address per carrier.

17. The system of claim 13, wherein the router is assigned at least one IP address per port.

18. The system of claim 13, further comprising the router being configured to encrypt packets to be transferred.

19. The system of claim 13, with the router being further configured to regulate bandwidth by carrier.

20. The system of claim 13, with the router being further configured to record packet through-put by carrier.

21. The system of claim 13, further comprising the router granting excess bandwidth to a carrier when a corresponding carrier bandwidth exceeds a predetermined bandwidth threshold.

22. The system of claim 13, with the router being configured to determine when a Quality of Service (QoS) of a particular carrier is below a predetermined quality threshold and allocate and charge for a predetermined additional bandwidth if the QoS of the particular carrier drops below the predetermined quality threshold.

23. The system of claim 22, with the router being further configured to monitor a latency QoS characteristic.

24. The system of claim 22, with the router being further configured to monitor an average bandwidth QoS characteristic.

* * * * *